United States Patent
Raz et al.

(10) Patent No.: US 12,505,046 B1
(45) Date of Patent: Dec. 23, 2025

(54) SYSTEM AND METHOD FOR DYNAMIC CLUSTER-BASED CACHE COHERENCY FOR MULTI-CORE PROCESSORS

(71) Applicant: Next Silicon Ltd, Givatayim (IL)

(72) Inventors: Elad Raz, Ramat Gan (IL); Dan Shechter, Tel Aviv, IL (US)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 19/235,711

(22) Filed: Jun. 12, 2025

(51) Int. Cl.
*G06F 12/08* (2016.01)
*G06F 9/30* (2018.01)
*G06F 12/0875* (2016.01)

(52) U.S. Cl.
CPC ........ *G06F 12/0875* (2013.01); *G06F 9/3004* (2013.01); *G06F 2212/452* (2013.01)

(58) Field of Classification Search
CPC ............................ G06F 12/0875; G06F 9/3004
See application file for complete search history.

(56) References Cited

U.S. PATENT DOCUMENTS

2002/0065867 A1 * 5/2002 Chauvel ................ G06F 1/3203
718/103
2017/0371783 A1 * 12/2017 Le ........................ G06F 12/0831

* cited by examiner

*Primary Examiner* — Jae U Yu

(57) ABSTRACT

A system for managing cache coherency comprises memory areas, processing cores, cache nodes each associated with at least one of the processing cores, and a hardware processor configured to: for each of the memory areas: cluster the processing cores into clusters according to memory access metrics in relation to the memory area; and for each of the clusters, associate the memory area with a caching scheme; and configure the processing cores to: receive from a first core a memory access command comprising a memory address associated with a memory area, where the first core is a member of a first cluster for the memory area; compute a determination of a target cache node according to the memory access command, where the target cache node is associated with a second core; and access the memory area according to the caching scheme associated with the memory area for the first cluster.

19 Claims, 6 Drawing Sheets

SYSTEM AND METHOD FOR DYNAMIC CLUSTER-BASED CACHE COHERENCY FOR MULTI-CORE PROCESSORS

BACKGROUND

Some embodiments described in the present disclosure relate to cache coherency management in multi-core processor systems and, more specifically, but not exclusively, to dynamic clustering of processing cores with adaptive caching schemes to optimize memory access performance in Non-Uniform Cache Architecture (NUCA) and Network-on-Chip (NoC) systems.

Cache coherency represents a fundamental challenge in modern multi-core processor architectures, particularly as systems scale to encompass hundreds or thousands of processing cores distributed across multiple Non-Uniform Memory Access (NUMA) nodes, using hundreds or thousands of NUCA cache banks and interconnected through complex NoC infrastructures.

Memory caching involves storing a duplicate of data in a memory component that offers quicker access times compared to the memory where the data is originally stored. This approach is designed to minimize the latency experienced by a processing core when retrieving data. By "bringing data closer," caching mechanisms physically or logically position data in memory components, such as cache levels (L1, L2, L3), that are nearer to the processing cores and additionally or alternatively respond faster, thereby reducing the time it takes for data to travel from memory to the processing core. Reducing memory access latency is advantageous because it can speed up data retrieval, leading to faster program execution and improved overall system performance. As used herein, the term "cache coherency" refers to the consistency of shared resource data that ends up stored in multiple local caches within a multi-core processing system. When multiple processing cores access and modify the same memory areas, complex protocols are required to ensure that each core sees the most recent data, which can introduce significant complexity and performance overhead. The challenge becomes increasingly complex when multiple processing cores attempt to access the same physical memory locations, creating potential race conditions that must be resolved through sophisticated tracking and coordination mechanisms.

As used herein, the term "Network-on-Chip" or "NoC" refers to a communication subsystem between cores in a system on a chip, typically implemented as a network of routing junctions and links that connect processing cores, cache nodes, and memory controllers. NoC architectures introduce additional complexity to cache coherency management because data must traverse multiple network hops between processing cores and memory locations, with each hop introducing both latency and potential congestion. The routing decisions and network topology in NoC systems significantly impact the performance benefits of different caching strategies, making uniform cache coherency approaches increasingly inefficient as system scale and complexity increase.

For brevity, henceforth the term "coherency protocol" is used to mean any mechanism for maintaining cache coherency and the terms are used interchangeably.

The performance implications of cache coherency become particularly pronounced in NUCA architectures, where memory access time depends on a relationship between a memory area and a processing core accessing it, for example the location of a cache bank caching the memory area relative to the processor accessing it, or a value of another memory access metric pertaining to access from the processing core to the memory area and/or to the cache bank caching it. As used herein, the term "NUCA architecture" refers to a computer cache memory design used in multi-core or many-core processors where access latency to different parts of the cache (different cache banks) varies depending on physical distance between the processor core and a cache bank, memory access metrics of different cache banks, or a combination thereof, in contrast to traditional uniform cache designs. In large-scale processors, the variation in cache access times can be significant, and advanced NUCA implementations may include mechanisms for data migration or replication to improve performance by reducing average access latency. Such migration and/or replication methods may increase the challenge in maintaining cache coherency.

Some current solutions attempt to address coherency challenges through one of two primary approaches: cache line duplication with careful coherency maintenance, and deterministic routing to a single active cache location per memory area. Cache line duplication offers the advantage of local access speed but introduces significant overhead in maintaining coherency across multiple copies. The duplication process itself can be time-consuming, particularly when cache lines are large or when the source and destination processing cores of the duplication are physically distant from each other, for example requiring multiple network hops in NoC architectures. The migration of cache lines between distant processing cores can introduce substantial latency that negates the performance benefits of local caching, especially when network congestion occurs or when multiple cores simultaneously attempt to access the same memory areas.

Conversely, deterministic routing to a single cache location eliminates duplication overhead but can create bottlenecks when multiple cores require access to the same memory areas. This approach still suffers from latency issues when accessing cores are distant from the target cache location, particularly in large NoC systems where the physical distance between cores and the designated cache location can span many network hops. Additionally, deterministic routing can lead to uneven utilization of network resources, with some network segments becoming congested while others remain underutilized.

Current approaches typically commit to a single caching strategy across the entire system, failing to recognize that different memory areas may benefit from different caching approaches depending on the spatial and temporal locality of access patterns from various processing cores. This uniform approach becomes increasingly inefficient as system scale increases, because the optimal caching strategy for a memory area accessed primarily by cores within a single NUCA cache bank differs significantly from the optimal strategy for memory areas accessed by cores whose association with the cache is distributed across multiple NUCA cache banks. Furthermore, existing solutions fail to adapt dynamically to changing access patterns that occur during application execution, missing opportunities to optimize performance as workload characteristics evolve.

The scalability limitations of existing coherency protocols become particularly apparent in systems with hundreds or thousands of cores, where directory overhead grows substantially and the latency of coherency operations increases due to the physical distances and network complexity involved. These limitations are exacerbated in heterogeneous systems that include different types of processing cores, such as CPU cores, GPU cores, and specialized accelerators, each with different memory access patterns and performance requirements.

SUMMARY

It is an object of some embodiments described in the present disclosure to provide a system and a method for dynamic cluster-based cache coherency that addresses the limitations of conventional caching approaches by intelligently combining duplication and deterministic routing strategies based on processing core relationships and memory access patterns.

In some embodiments described herewithin, a plurality of processing cores are clustered according to memory access metrics for each memory area independently. In such embodiments, rather than applying a uniform caching strategy across the entire system, for each specific memory area and for each cluster of processing cores accessing the specific memory area, the specific memory area is associated with one of multiple available caching schemes, selecting the most appropriate scheme for accessing the specific memory area from processing cores in the cluster based on one or more memory access metrics such as access latency, frequency, bandwidth utilization, and inter-core communication patterns.

When a processing core requests access to a memory area, the system determines the target cache node using a deterministic function and applies the caching scheme associated with that memory area for the requesting processing core's cluster. This allows the system to use copying schemes for inter-cluster accesses where duplication may provide performance benefits, while employing redirection schemes for intra-cluster accesses where deterministic routing may be more efficient.

The system optionally adapts dynamically to changing access patterns by collecting memory access statistics and reconfiguring clusters and caching associations, for example when warranted by evolving workload characteristics.

The foregoing and other objects are achieved by the features of the independent claims. Further implementation forms are apparent from the dependent claims, the description and the figures.

According to a first aspect, a system for managing cache coherency comprises: a plurality of memory areas; a plurality of processing cores connected to the plurality of memory areas; a plurality of cache nodes caching the plurality of memory areas, each associated with at least one of the plurality of processing cores; and at least one hardware processor configured to: for each memory area of the plurality of memory areas: cluster the plurality of processing cores into a plurality of clusters according to at least one memory access metric in relation to the memory area; and for each cluster of the plurality of clusters, associate the memory area with one of a plurality of caching schemes; and configure the plurality of processing cores to: receive from a first processing core of the plurality of processing cores a memory access command comprising a memory address associated with a memory area of the plurality of memory areas, where the first processing core is a member of a first cluster for the memory area; compute a determination of a target cache node of the plurality of cache nodes according to the memory access command, where the target cache node is associated with a second processing core of the plurality of processing cores; and access the memory area according to the caching scheme associated with the memory area for the first cluster.

According to a second aspect, a method for managing cache coherency comprises: for each memory area of a plurality of memory areas, cached in a plurality of cache nodes, each of the plurality of cache nodes associated with at least one of a plurality of processing cores connected to the plurality of memory areas: clustering the plurality of processing cores into a plurality of clusters according to at least one memory access metric in relation to the memory area; and for each cluster of the plurality of clusters, associating the memory area with one of a plurality of caching schemes; receiving from a first processing core of the plurality of processing cores a memory access command comprising a memory address associated with a memory area of the plurality of memory areas, where the first processing core is a member of a first cluster for the memory area; computing a determination of a target cache node of the plurality of cache nodes according to the memory access command, where the target cache node is associated with a second processing core of the plurality of processing cores; and accessing the memory area according to the caching scheme associated with the memory area for the first cluster.

According to a third aspect, a software program product for managing cache coherency comprises: a non-transitory computer readable storage medium; first program instructions for: for each memory area of a plurality of memory areas, cached in a plurality of cache nodes, each of the plurality of cache nodes associated with at least one of a plurality of processing cores connected to the plurality of memory areas: clustering the plurality of processing cores into a plurality of clusters according to at least one memory access metric in relation to the memory area; and for each cluster of the plurality of clusters, associating the memory area with one of a plurality of caching schemes; second program instructions for: receiving from a first processing core of the plurality of processing cores a memory access command comprising a memory address associated with a memory area of the plurality of memory areas, where the first processing core is a member of a first cluster for the memory area; third program instructions for: computing a determination of a target cache node of the plurality of cache nodes according to the memory access command, where the target cache node is associated with a second processing core of the plurality of processing cores; and fourth program instructions for: accessing the memory area according to the caching scheme associated with the memory area for the first cluster; wherein the first, second, third and fourth program instructions are executed by at least one computerized processor from the non-transitory computer readable storage medium.

With reference to the first and second aspects, in a first possible implementation of the first and second aspects the plurality of caching schemes comprises: a copying scheme, allowing, when the first processing core accesses the memory area, at least one cache line associated with the memory area and cached in the target cache node to be copied to a new target cache node, of the plurality of cache nodes, local to the first processing core; and a redirection scheme, wherein an access to the memory area from the first processing core must be redirected to the target cache node without duplication. Supporting a copying scheme allows copying one or more cache lines to a new target cache node which may be beneficial in reducing load on a cache bank caching a memory area containing frequently accessed data structures shared among a plurality of processing cores, and additionally or alternatively may be beneficial in reducing latency when accessing multiple times a memory area that is remote to an accessing processing core. Supporting a redirection scheme that redirects a memory access request to a target cache may be beneficial for accessing large sequential data streams, and additionally or alternatively when a cost of copying one or more cache lines exceeds a predetermined threshold.

With reference to the first and second aspects, or the first implementation of the first and second aspects, in a second possible implementation of the first and second aspects a second cluster of the plurality of clusters comprises the second processing core, where the second cluster is not the first cluster, and the caching scheme associated with the memory area for the first cluster is the copying scheme. Optionally, accessing the memory area according to the caching scheme comprises: copying the at least one cache line containing the memory area to the new target cache node local to the first processing core; and performing the memory access command on the new target cache node. Optionally accessing the memory area according to the caching scheme further comprises computing a copying cost according to at least one of: the first processing core, the second processing core and a number of bytes in the at least one cache line. Optionally copying the at least one cache line is subject to the copying cost exceeding an identified copying cost threshold. Copying the one or more cache lines subject to the copying cost exceeding the identified copying cost allows balancing between copying cost and access cost, improving overall performance, compared to always copying when allowed or never copying. Optionally accessing the memory area according to the caching scheme further comprises invalidating the at least one cache line in the target cache node. Invalidating the one or more cache lines in the target cache node simplifies implementation of the copying scheme, using cache-line fetching mechanism when there is no valid cache for data from a memory area. In addition, invalidating the one or more cache lines improves accuracy of cache coherency mechanisms implemented in the system.

With reference to the first and second aspects, or the first implementation of the first and second aspects, in a third possible implementation of the first and second aspects the first cluster comprises the second processing core; and the caching scheme associated with the memory area for the first cluster is the redirection scheme. Optionally, accessing the memory area according to the caching scheme comprises issuing a command to the target cache node to perform the memory access command.

With reference to the first and second aspects, in a fourth possible implementation of the first and second aspects computing the determination of the target cache node comprises applying a deterministic function to at least one parameter derived from the memory access command. Optionally, the at least one parameter comprises at least one of: a memory address, an access type, an originating process identifier, an originating processing core identifier, a memory area type, a type of data, an originating thread identifier, or a cache bit. Using a deterministic target cache node simplified maintaining cache coherency.

With reference to the first and second aspects, in a fifth possible implementation of the first and second aspects the first processing core is associated with a page table comprising a plurality of page table entries; and associating the memory area with one of a plurality of caching schemes comprises storing the association in a page table entry (PTE) of the plurality of page table entries, the PTE corresponding to the memory area. Optionally, the first processing core is associated with a translation lookaside buffer (TLB) comprising a plurality of TLB entries; and a field in a TLB entry of the plurality of TLB entries indicates a target cluster of the plurality of clusters for the memory area. Using a PTE and additionally or alternatively a TLB simplifies implementation of dynamic selection of cache method by page, for example in a system where lookup per page in a page table and/or a TLB may already exist.

With reference to the first and second aspects, in a sixth possible implementation of the first and second aspects each cluster of the plurality of clusters contains a common amount of processing cores. Optionally, each of the plurality of clusters has at least 4 processing cores and at most 16 processing cores. Using equal sized clusters simplifies implementation of clustering and cluster based caching, allowing the use of a fixed number of bits to indicate a target of a memory access command and simplified communication channels to manage the caching.

With reference to the first and second aspects, in a seventh possible implementation of the first and second aspects the at least one hardware processor is further configured to: collect a plurality of memory access statistical values of a plurality of memory accesses from the plurality of processing cores to the plurality of memory areas; and cluster the plurality of processing cores into a plurality of clusters according to the at least one memory access metric further using the plurality of memory access statistical values. Optionally, associating the memory area with one of a plurality of caching schemes for each of the plurality of clusters is further using the plurality of memory access statistical values. Using statistical values collected during operation of the system increases accuracy of clustering the plurality of processing cores and of associating a memory area with a caching scheme for each of the plurality of clusters, for example by better addressing actual access patterns (in addition to or instead of theoretically computed anticipated patterns), thus increasing overall system performance.

With reference to the first and second aspects, in an eighth possible implementation of the first and second aspects the at least one hardware processor is further configured to: compute a new association between the memory area and another of the plurality of caching schemes; and further configure the plurality of processing cores according to the new association. Optionally, further configuring the plurality of processing cores according to the new association comprises flushing one or more of: a TLB associated with the first processing core; another TLB associated with the second processing core; at least one of the plurality of cache nodes associated with the first processing core; at least one other of the plurality of cache nodes associated with the second processing core; and at least one additional cache node of the plurality of cache nodes associated with another processing core that is a member of another cluster of the plurality of clusters where the other cluster comprises at least one of the first processing core or the second processing core. Optionally, computing the new association is triggered by at least one of: a periodic evaluation at a predetermined interval, an outcome of analyzing another plurality of memory access statistical values, a topology change in the system, an application-specific optimization hint, or a number of cache coherency events. Repeating collection of statistical values and reconfiguring the plurality of clusters and associations with caching schemes allows dynamic adjustment of the system's caching to changing memory access patterns over time, thus increasing system performance over time.

With reference to the first and second aspects, in a ninth possible implementation of the first and second aspects the at least one memory access metric comprises at least one of: access latency, access frequency, memory bandwidth, cache-hit rate, or inter-core communication patterns.

With reference to the first and second aspects, in a tenth possible implementation of the first and second aspects the system further comprises specialized memory management circuitry associated with the first processing core; and the specialized memory management circuitry implements copying, invalidating and redirection capabilities. Optionally, at least one of the plurality of processing cores is configured to receive, compute and access through memory management circuitry integrated with the at least one of the plurality of processing cores. Implementing one or more of copying, invalidating and redirection capabilities in specialized memory management circuitry facilitates shorter latencies in responding to a memory access request.

With reference to the first and second aspects, in an eleventh possible implementation of the first and second aspects at least one of the plurality of processing cores is configured to receive, compute and access through one or more cache control instructions executed by the at least one processing core, without requiring specialized hardware beyond standard cache coherency mechanisms.

With reference to the first and second aspects, in a twelfth possible implementation of the first and second aspects at least some of the plurality of processing cores are implemented in a reconfigurable processing grid, comprising a plurality of logical elements connected by a plurality of reconfigurable data routing junctions.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the accompanying drawings, like reference numerals are used consistently across the figures to denote like elements or components. This consistency is intended to aid in the understanding of the embodiments and should not be construed as limiting the scope of the invention to the specific configurations illustrated.

DETAILED DESCRIPTION

Figure 1:
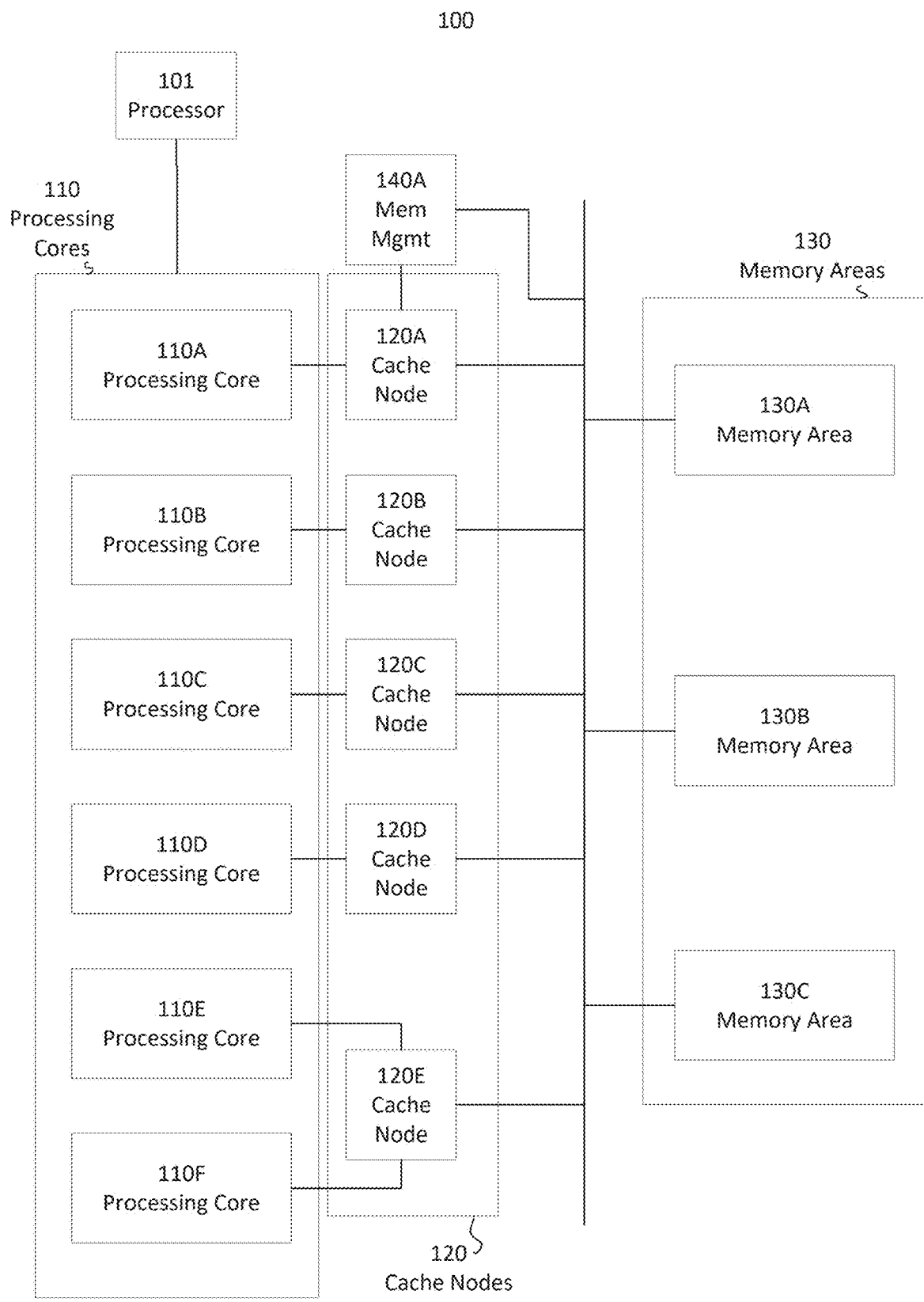
FIG. 1 is a schematic block diagram of an exemplary system, according to some embodiments.

Some embodiments described in the present disclosure provide systems and methods for dynamic cluster-based cache coherency management that adaptively selects between multiple caching strategies based on processing core relationships and memory access characteristics. Some of the disclosed embodiments address the limitations of existing cache coherency approaches by providing a hybrid system that combines the advantages of cache line duplication and deterministic routing while mitigating their respective disadvantages.

As used herein, the term "cluster" refers to a grouping of processing cores based on similarity according to one or more memory access metrics, wherein processing cores within the same cluster exhibit greater similarity in memory access patterns or characteristics than other processing cores in different clusters. It should be noted that although the present disclosure describes clustering objects that are processing cores, the term "cluster" does not relate to any topological organization of a plurality of processing cores in the system or any functional affinity besides memory access metrics upon which the plurality of processing cores are clustered into a plurality of clusters.

As used herein, the term "processing core" refers to a computational unit capable of executing instructions and performing operations on data. A processing core may be, but is not limited to, a central processing unit (CPU) core, a graphics processing unit (GPU) core, a digital signal processor (DSP) core, a neural processing unit (NPU), a tensor processing unit (TPU), a field-programmable gate array (FPGA) processing element, an Intelligent Compute Architecture (ICA), or any other computational element capable of executing instructions and generating memory access requests.

A processing core may be implemented as part of a multicore processor, wherein multiple cores are integrated into a single integrated circuit to enhance computational parallelism. Optionally, a processing core is distributed across multiple physical chips or packages in a computing system. Some examples of processing cores include x86 CPU cores, ARM CPU cores, NVIDIA CUDA cores, AMD compute units, Intel execution units, RISC-V cores, and custom arithmetic logic units (ALUs) designed for specific computational tasks. A processing core may be implemented in a reconfigurable processing grid, where the reconfigurable processing grid comprises a plurality of reconfigurable logical elements connected via a plurality of reconfigurable routing junctions. Optionally, a processing core comprises at least some of the plurality of reconfigurable logical elements and at least some of the plurality of reconfigurable data routing junctions.

Optionally, a processing core is associated with dedicated or shared cache memory to reduce memory access latency.

Processing cores may vary in their architectural complexity, instruction set support, performance characteristics, power consumption, and specialized capabilities, but all share the common function of performing computational operations that may require access to memory areas.

Some examples of a memory area include, but are not limited to: a memory component directly coupled to one or more processing cores, a memory component connected to the one or more processing cores via a bus, and a memory component connected to the one or more processing cores via an exchange.

For brevity, unless otherwise noted the term "application" is used to mean "software application" and the terms are used interchangeably.

The inventors have found that existing uniform cache coherency approaches fail to optimize performance because they ignore the fundamental heterogeneity in memory access patterns across different memory areas and processing core combinations. Specifically, uniform approaches assume that the optimal caching strategy for one memory area applies equally to all other memory areas, which fails to account for the reality that different memory areas exhibit vastly different spatial and temporal locality characteristics. For example, a memory area containing frequently accessed shared data structures may benefit from a copying scheme that duplicates cache lines across multiple processing cores, while a memory area containing large sequential data streams may perform better with a redirection scheme that avoids duplication overhead. Uniform approaches force all memory areas to use the same caching strategy regardless of their individual access characteristics, resulting in suboptimal performance where some memory areas are over-cached while others are under-cached.

Additionally, uniform approaches fail to recognize that the relationship between processing cores and memory areas is not static but varies depending on application phases, workload characteristics, and system utilization patterns. A processing core that exhibits high locality for one memory area may show entirely different access patterns for another memory area, yet uniform approaches treat all processing core-memory area relationships identically. This leads to inefficient resource utilization, unnecessary network traffic in NoC architectures, and missed opportunities for performance optimization.

The present disclosure, in some embodiments herewithin, addresses these limitations by providing a cache coherency system that integrates with existing memory management infrastructure while extending its capabilities to support per-memory-area clustering and adaptive caching scheme selection. The system optionally leverages standard memory management structures, including page tables and translation lookaside buffers (TLBs), to store and rapidly access clustering and caching scheme information without requiring fundamental changes to existing processor architectures.

As used herein, the term "page table entry" or "PTE" refers to an entry in a page table that contains information about the mapping between virtual memory addresses and physical memory addresses, along with associated attributes and permissions. In some embodiments, the system extends standard PTE formats to include additional fields that indicate the caching scheme associated with the memory area corresponding to the page. This approach allows the system to determine the appropriate caching strategy during normal address translation operations, for example virtual-to-physical address translation, without requiring separate lookup mechanisms or additional memory accesses.

As used herein, the term "translation lookaside buffer" or "TLB" refers to a cache used by the memory management unit to improve virtual address translation speed by storing recent translations of virtual memory addresses to physical memory addresses along with associated page attributes. In some embodiments, the system extends TLB entries to include cluster identification fields that specify which cluster a processing core belongs to for accessing a particular memory area. This enables rapid determination of cluster membership during memory access operations, allowing the system to quickly identify the appropriate caching scheme for each memory access request.

The integration with existing memory management structures provides several advantages, including leveraging established memory mechanisms, for example virtual memory mechanisms, minimizing hardware changes required for implementation, and ensuring compatibility with existing operating systems and memory management software. The system optionally utilizes the existing TLB hierarchy and page table walking mechanisms to access clustering and caching scheme information, thereby avoiding the need for separate hardware structures or lookup tables.

For copying schemes, the system optionally implements copying cost calculation mechanisms that evaluate whether cache line duplication provides sufficient performance benefits to justify the associated overhead. As used herein, the term "copying cost" refers to a computational assessment of the resources and time required to duplicate a cache line from one cache node to another, considering factors such as the physical or logical distance between source and destination processing cores, the size of the cache line or cache lines to be copied, current network congestion in NoC architectures, the frequency of expected access to the duplicated cache line and any combination of one or more thereof.

The copying cost calculation optionally considers one or more of: the source processing core location, destination processing core location, current system load, available network bandwidth, cache line size, and historical access patterns for the memory area. When the calculated copying cost exceeds a predetermined threshold, the system may choose to use a redirection scheme instead of copying, or may defer the copying operation until system conditions become more favorable. Optionally, the system maintains separate cost thresholds for different types of memory areas or different cluster configurations, allowing for fine-tuned optimization based on system characteristics and workload requirements.

The system optionally implements copying cost calculations using dedicated hardware accelerators, software algorithms executed on processing cores, or hybrid approaches that combine hardware acceleration for time-critical calculations with software-based policy management. The cost calculation mechanisms enable the system to make intelligent decisions about when cache line duplication provides net performance benefits versus when redirection or other strategies are more appropriate.

To allow dynamic selection between multiple cache coherency schemes, in such embodiments the present disclosure proposes clustering a plurality of processing cores for each memory area of a plurality of memory areas connected to the plurality of processing cores, where the clustering is according to one or more memory access metrics related to the memory area. Optionally, memory access patterns and memory access metrics are analyzed to create dynamic clusters. As used herein, the term "memory access metric" refers to any measurable characteristic of memory access behavior, including but not limited to access latency, access frequency, memory bandwidth utilization, cache hit rates, and inter-core communication patterns. The clustering process optionally considers these metrics to group processing cores that would benefit from similar caching strategies when accessing a specific memory area.

For each identified cluster and memory area combination, the present disclosure proposes in such embodiments associating one of a plurality available caching schemes. The caching schemes optionally include a copying scheme that permits cache line duplication to locations closer to requesting cores, and a redirection scheme that routes access requests to predetermined cache locations without creating additional copies. The choice between the plurality of caching schemes to associate with the identified cluster and memory area combination may depend on one or more factors such as a relationship between one or more processing cores in the cluster and a location of a target cache caching the memory area, a size of cache lines, frequency of access, and a computational cost of copying versus redirection.

When a processing core issues a memory access command, the system optionally determines the appropriate caching scheme based on the requesting core's cluster membership for the target memory area, optionally by consulting the extended PTE and additionally or alternatively TLB information during a normal address translation process. For copying schemes, the system optionally evaluates copying costs, optionally using the cost calculation mechanisms described above, before deciding whether to perform actual copying operations. For redirection schemes, the system optionally routes memory access commands to the designated target cache node while maintaining coherency without duplication.

The system optionally includes capabilities for dynamic reconfiguration of clusters and caching scheme associations. Evaluation of memory access statistics collected while the system operates enables the system to detect changes in access patterns that may warrant different clustering arrangements or caching strategies. Optionally, memory access statistics are evaluated periodically. Cluster reconfiguration operations optionally include flushing translation lookaside buffers and associated cache structures to ensure consistency with new configurations, leveraging existing TLB management mechanisms to propagate configuration changes throughout the system.

Implementation options include both hardware-based and software-based approaches. Hardware implementations optionally utilize specialized memory management circuitry integrated with processing cores to handle clustering decisions and cache operations. Software implementations optionally execute cache control instructions on standard processing cores using existing cache coherency mechanisms. Hybrid implementations optionally combine dedicated hardware for performance-critical operations with software-based management for flexibility and adaptability.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments. In such embodiments, a plurality of processing cores 110 is connected to a plurality of memory areas 130. Optionally, the plurality of memory areas 130 is cached in a plurality of cache nodes 120.

In this example, the plurality of processing cores comprises processing core 110A, processing core 110B, processing core 110C, processing core 110D, processing core 110E, and processing core 110F. Further in this example, the plurality of memory areas 130 comprises memory area 130A, memory area 130B and memory area 130C.

Further in this example, the plurality of cache nodes 120 comprises cache node 120A, cache node 120B, cache node 120C, cache node 120D, and cache node 120E. Optionally, each of the plurality of cache nodes 120 is associated with one or more of the plurality of processing cores 110. For example, cache node 120A may be associated with processing core 110A, cache node 120B may be associated with processing core 110B, cache node 120C may be associated with processing core 110C, cache node 120D may be associated with processing core 110D, and cache node 120E may be associated with processing core 110E and processing core 110F.

Optionally, system 100 comprises one or more memory management circuitries, each associated with one or more of the plurality of processing cores 110. In this example, memory management circuitry 140A is associated with processing core 110A.

Optionally, system 100 comprises at least one hardware processor 101, optionally connected to the plurality of processing cores 110.

For brevity, henceforth the term "processing unit" is used to mean "at least one hardware processor", and the terms are used interchangeably. The processing unit may be any kind of programmable or non-programmable circuitry that is configured to carry out the operations described above and below. The processing unit may comprise hardware as well as software. For example, the processing unit may comprise one or more processors and a transitory or non-transitory memory that carries a program which causes the processing unit to perform the respective operations when the program is executed by the one or more processors.

Optionally, processing unit 101 is connected to at least some of the plurality of processing cores 110 via a bus. Optionally, processing unit 101 is connected to the plurality of processing cores 110 via a digital network connection interface (not shown). Optionally, processing unit 101 is electrically coupled with at least one of the plurality of processing cores 110. Optionally, processing unit 101 is at least one of the plurality of processing cores 110.

Figure 2:
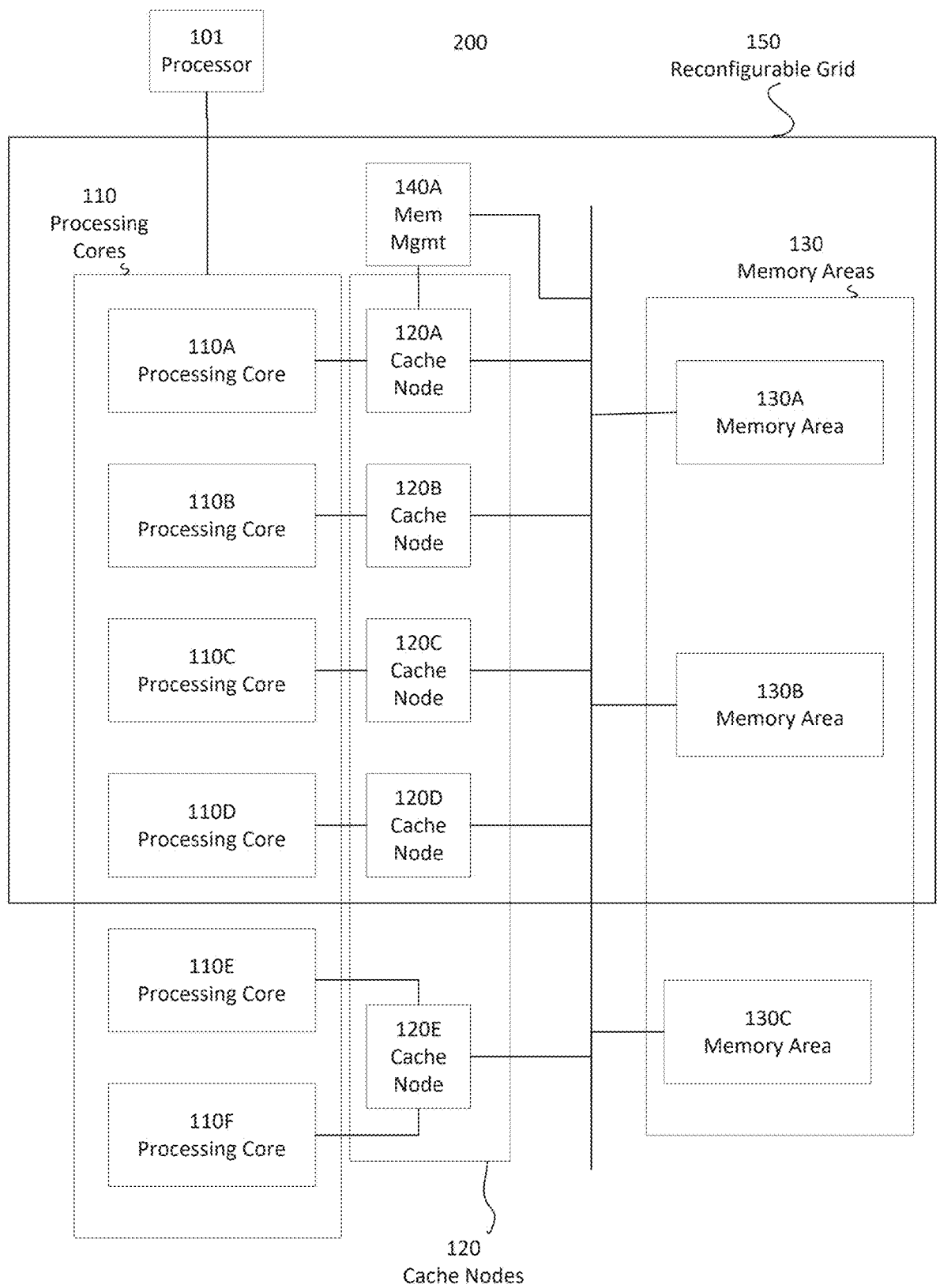
FIG. 2 is a schematic block diagram of another exemplary system, according to some embodiments.

In some embodiments, at least some components are implemented in one or more reconfigurable processing grids. Reference is now made also to FIG. 2, showing a schematic block diagram of another exemplary system 200, according to some embodiments. In such embodiments, at least one reconfigurable processing grid 150 comprises a plurality of reconfigurable logical elements connected by a plurality of reconfigurable data routing junctions. An example of a reconfigurable logical element is processing circuitry that may be configured to perform one of an identified set of mathematical and logical operations. Some examples of a mathematical operation are addition, subtraction, multiplication and division. Some examples of a logical operation are a logical NOT operation, a logical exclusive-or (XOR) operation, a bitwise XOR operation and a logical AND operation. Optionally, the plurality of processing cores 110 comprises a first subset of processing cores that are implemented in the reconfigurable processing grid 150, for example comprising processing core 110A, processing core 110B, processing core 110C, and processing core 110D.

Optionally, the plurality of processing cores 110 comprises a second subset of processing cores that are external to the at least one reconfigurable processing grid 150 and connected thereto, for example comprising processing core 110E and processing core 110F. Optionally, at least some of the plurality of memory areas 130 are implemented in the reconfigurable processing grid 150, for example memory area 130A, and memory area 130B. Optionally at least some other of the plurality of memory areas 130, for example comprising memory area 130C, are external to the at least one reconfigurable processing grid 150 and connected thereto. Optionally, processing unit 101 is implemented in at least one reconfigurable processing grid 150.

To apply variable cache coherency schemes to a plurality of memory accesses between the plurality of processing cores to the plurality of memory areas 130, in some embodiments system 100 or system 200 implement the following optional method.

Figure 3:
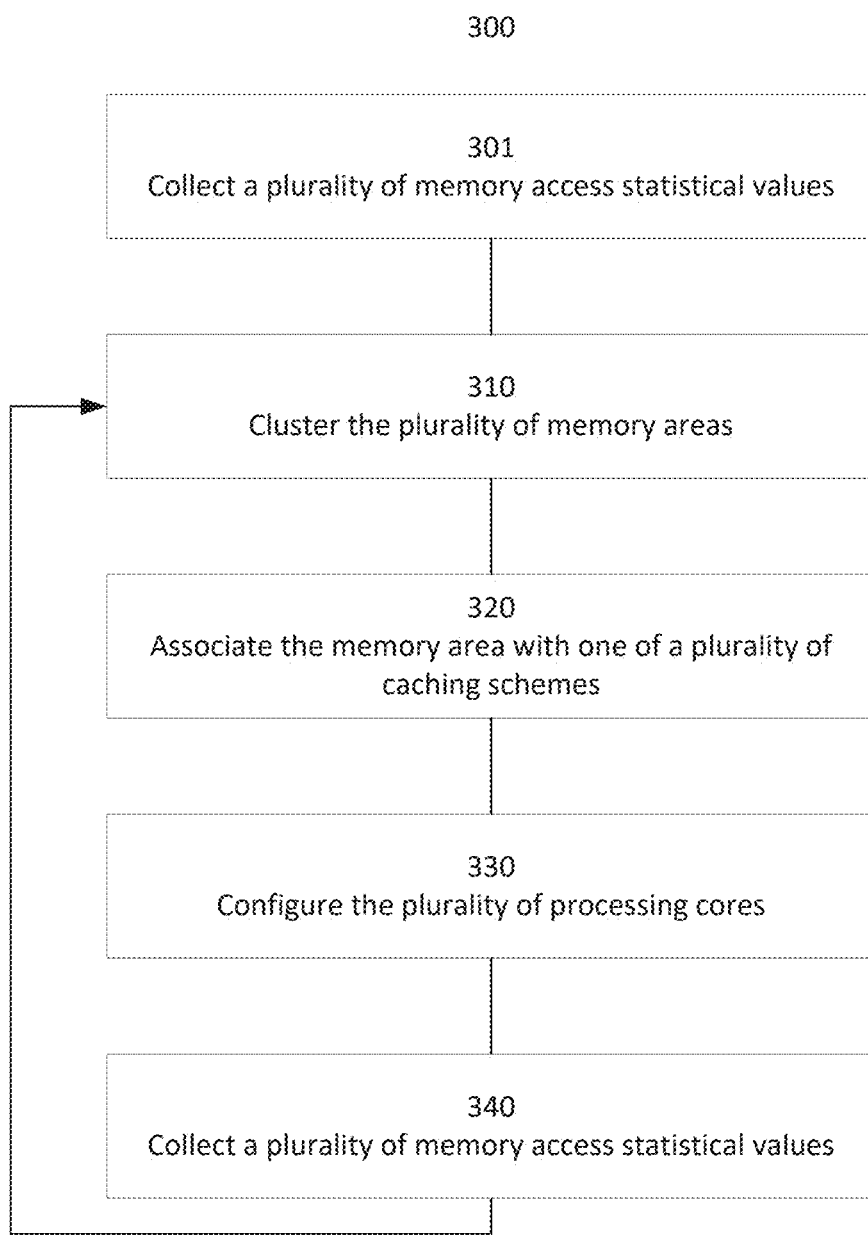
FIG. 3 is a flowchart schematically representing an optional flow of operations for configuring cache coherency, according to some embodiments.

Reference is now made also to FIG. 3, showing a flowchart schematically representing an optional flow of operations 300 for configuring cache coherency, according to some embodiments. In such embodiments, the flow optionally begins in 301 where processing unit 101 collects a plurality of memory access statistical values while system 100 or system 200 operate, for example executing one or more software applications. Some examples of a memory access statistical value include, but are not limited to, an access type, an access latency, a number of bytes in an access, an access frequency, a memory bandwidth utilization value, a cache hit rate, a memory address, a topological position of a memory area in the plurality of memory areas 130, a topological position of a processing core in the plurality of processing cores 110, and an inter-core communication pattern. Optionally, processing unit 101 collects the plurality of memory access statistical values continuously during system operation. Optionally, processing unit 101 collects the plurality of memory access statistical values periodically at predetermined intervals. Optionally, processing unit 101 collects the plurality of memory access statistical values in response to one or more specific triggering events such as changes in system topology or application workload characteristics.

In 310, processing unit 101 optionally clusters the plurality of processing cores 110 into a plurality of clusters for a memory area of the plurality of memory areas 130. Optionally, processing unit 101 clusters the plurality of processing cores 110 according to one or more memory access metrics in relation to the memory area. Optionally, processing unit 101 executes 310 for each memory area of the plurality of memory areas 130, computing a plurality of clusters for each memory area of the plurality of memory areas 130.

Figure 4:
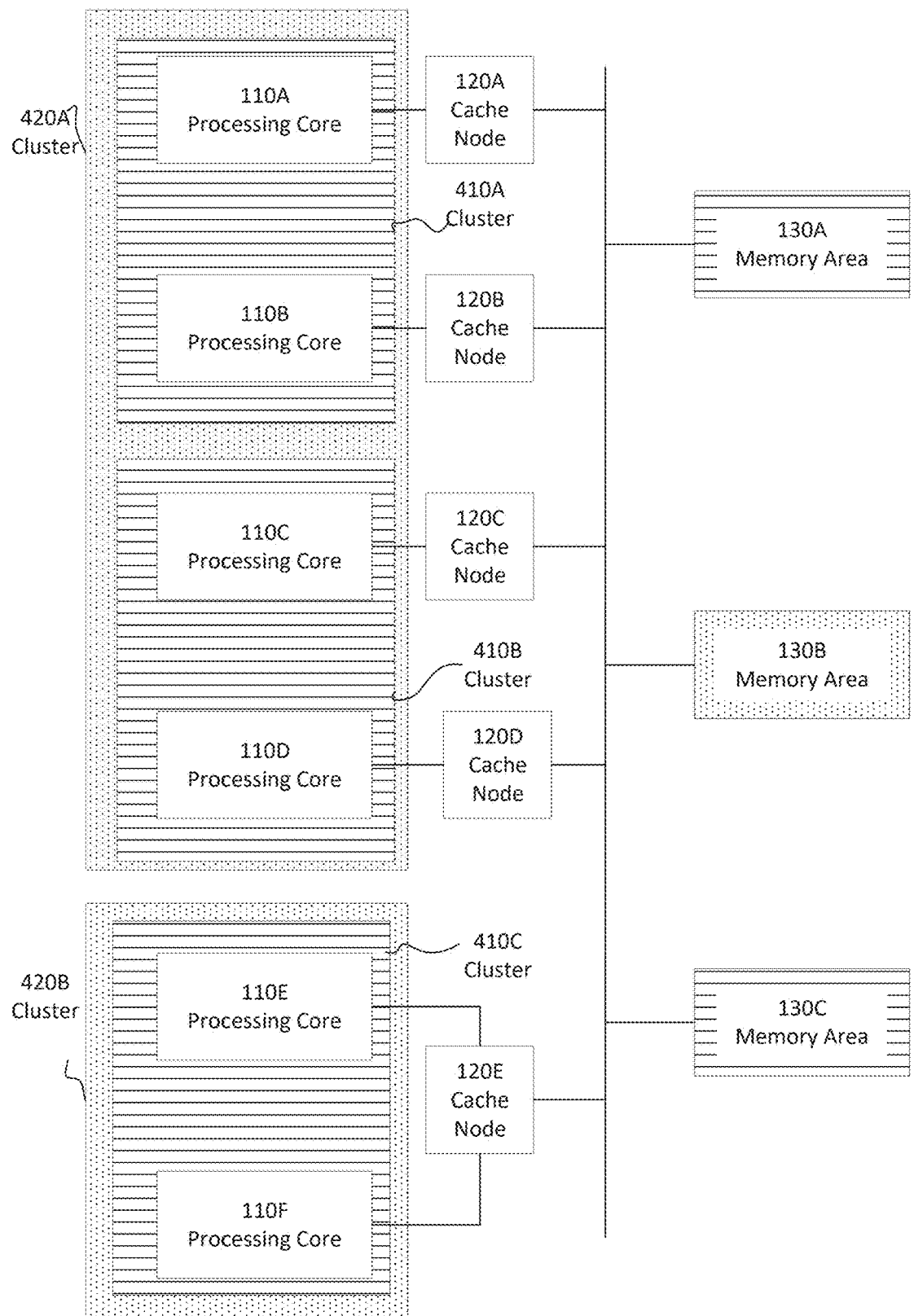
FIG. 4 is a schematic block diagram of an exemplary clustering, according to some embodiments.

Reference is now made also to FIG. 4, showing a schematic block diagram of an exemplary clustering 400, according to some embodiments. In this example, for memory area 130A processing unit 101 clusters the plurality of processing cores 110 in three clusters referred collectively as plurality of clusters 410: cluster 410A comprising processing core 110A and processing core 110B, cluster 410B comprising processing core 110C and processing core 110D, and cluster 410C comprising processing core 110E and processing core 110F. Optionally, also for memory area 130C processing unit 101 clusters the plurality of processing cores 110 in plurality of clusters 410.

Further in this example, for memory area 130B processing unit 101 clusters the plurality of processing cores 110 in another set of clusters comprising two clusters, referred collectively as other plurality of clusters 420: cluster 420A comprising processing core 110A, processing core 110B, processing core 110C, and processing core 110D, and cluster 420B comprising processing core 110E and processing core 110F.

To visually demonstrate associations between a memory area and a plurality of clusters, in FIG. 3 each memory area and the plurality of clusters created therefor. Thus, in this example, both memory area 130A and memory area 130C, that share the same plurality of clusters, are shaded in horizontal lines. Cluster 410A, cluster 410B and cluster 410C that are associated with memory area 130A and memory area 130C are also shaded in horizontal lines. On the other hand, memory area 130B and associated cluster 420A and cluster 420B are shaded in a dotted pattern.

Optionally, each cluster of the plurality of clusters contains a common amount of processing cores. For example, for memory area 130A and memory area 130C in this example each of cluster 410A, cluster 410B and cluster 410C has two processing cores. Using equal sized clusters simplifies implementation, allowing the use of a fixed number of bits to indicate a target of a memory access command and simplified communication channels to manage the caching. Optionally, each of the plurality of clusters has at least 4 processing cores and at most 16 processing cores. For example, when the plurality of memory areas 130 is organized in a two-dimensional grid and system 100 or system 200 are executing applications where all processing cores of the plurality of processing cores 110 access all memory areas of the plurality of memory areas 130, these values were found by the inventors to give better performance advantages than other values. However, it should be noted that when the plurality of memory areas is organized differently than a two-dimensional grid, and additionally or alternatively dependent on the bandwidth of the NoC, other cluster sizes may provide better performance improvement than using clusters having between 4 and 16 processing cores each.

Optionally, the plurality of clusters computed for a memory area may have a variable number of processing cores in each cluster. For example, for memory area 130B in this example cluster 420A has four processing cores, while cluster 420B has two processing cores. Clusters with a variable number of processing cores provides performance advantages, allowing fine tuning the selected caching scheme for each specific memory area-processing core pair, thus facilitating better overall improvement to memory system performance.

Reference is now made again to FIG. 3. Optionally, in 310 processing unit 101 uses the plurality of memory access statistical values collected in 301 when clustering the plurality of processing cores 110 according to the one or more memory access metrics. Optionally, execution of method 300 begins with step 310, without first collecting statistical values.

Some examples of a memory access metric include, but are not limited to, access latency, access frequency, memory bandwidth, cache-hit rate and inter-core communication patterns. Optionally, using the plurality of memory access statistical values comprises identifying one or more usage patterns. Optionally, processing unit 101 computes the plurality of clusters for a memory area according to the one or more usage patterns. A usage pattern may be computed according to any one or more types of memory access statistical values, for example one or more of an access type, an access latency, a number of bytes in an access, an access frequency, a memory bandwidth utilization value, a cache hit rate, a memory address, a topological position of a memory area in the plurality of memory areas 130, a topological position of a processing core in the plurality of processing cores 110, and an inter-core communication pattern.

Optionally, the plurality of clusters are clusters configured based on a NUMA topology, optionally to reduce inter-NUMA node communication. Optionally, the plurality of clusters are clusters configured based on a NUCA topology.

In 320, for each memory area and each cluster associated therewith, processing unit 101 optionally associates the memory area with one of a plurality of caching schemes. One example of a caching scheme is a redirection scheme, where a memory access to the memory area from a processing unit in a cluster associated with the memory area must be directed to a target cache node of the memory access without duplication. For example, for memory area 130A and cluster 410A, processing unit 101 may associate cluster 410A for memory area 130A with the redirection caching scheme such that whenever any of processing core 110A and processing core 110B access memory area 130A, the memory access is directed to a target cache node caching the requested data from memory area 130A. Redirection may be advantageous within a cluster. Optionally, the plurality of statistical value indicate that for a given memory area and processing core redirection may be advantageous.

Another example of a caching scheme is a copying scheme that allows one or more cache lines to be copied from a target cache node to a new target cache node, local to a processing core accessing the memory area. For example, for memory area 130A and cluster 410B, processing unit 101 may associate cluster 410B for memory area 130A with the copying caching scheme such that whenever any of processing core 110C and processing core 110D access memory area 130A, one or more cache lines cached in a target cache node caching the requested data from memory area 130A may be copied to a new target cache node associated with one or more of processing core 110C or processing core 110D. Optionally, the one or more cache lines are copied subject to a copying cost exceeding an identified cost threshold. Copying may be advantageous between clusters, for example when memory area 130A is associated with cache node 120B which in turn is associated with processing core 110B in cluster 410A, for an access to memory area 130A from processing core 110C in cluster 410B it may be advantageous to copy one or more cache lines from cache node 120B to cache node 120C, associated with processing core 110C. Optionally, the one or more cache lines in cache node 120B are invalidated upon copying the one or more cache lines. Optionally, the one or more cache lines in cache node 120B are invalidated before copying the one or more cache lines. Optionally, the memory access command is re-issued. Optionally re-issuing the memory access command triggers fetching the one or more cache lines to the new target cache node.

Optionally, one or more of the plurality of processing cores 110 is each associated with a page table. Optionally the page table comprises a plurality of page table entries. For example, processing core 110A may be associated with a first page table. Optionally, processing core 101 stores the association between the memory area and the caching scheme in a PTE of the first page table, where the first PTE corresponds to the memory area. For example, in a first PTE of the first page table corresponding to memory area 130A, processing unit 101 optionally stores an association with the redirection scheme. In a second page table associated with processing core 110C, processing unit 101 optionally stores in a second PTE of the second page table corresponding to memory area 130A another association with the copying scheme.

Optionally, one or more of the plurality of processing cores 110 is each associated with a translation lookaside buffer comprising a plurality of TLB entries. For example, processing core 110A may be associated with a first TLB. Optionally, a field in a TLB entry indicates a target cluster of the plurality of clusters 410 or the plurality of clusters 420 for a memory area of the plurality of memory areas 130.

In 330, processing unit 101 optionally configures the plurality of processing cores 110 to dynamically select a caching scheme for a memory access command. When method 300 is implemented in system 200, comprising reconfigurable processing grid 150, configuring the plurality of processing cores 110 optionally comprises manipulating one or more of the plurality of reconfigurable logical elements and additionally or alternatively manipulating one or more of the plurality of reconfigurable data routing junctions.

Optionally, processing unit 101 configures the plurality of processing cores 110 to implement the following optional method.

Figure 5:
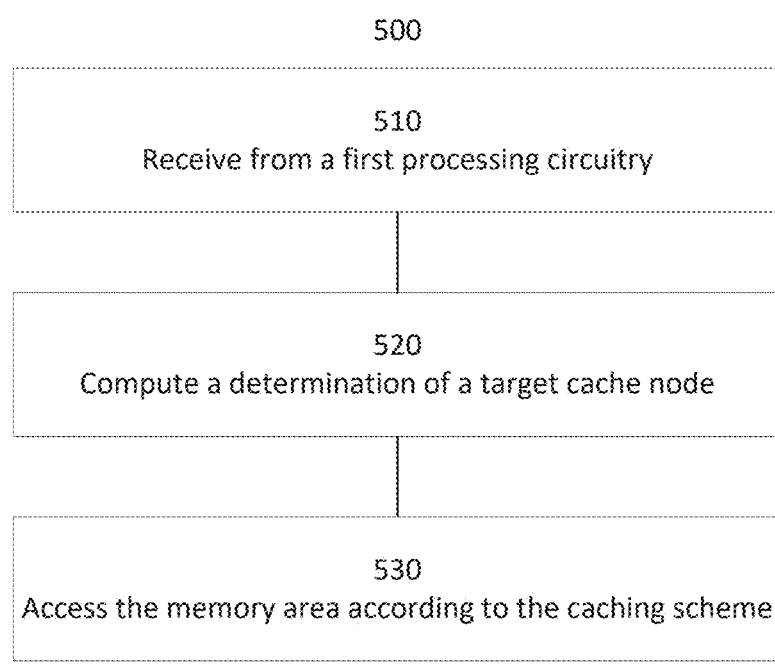
FIG. 5 is a flowchart schematically representing an optional flow of operations for cache coherency, according to some embodiments.

Reference is now made also to FIG. 5, showing a flowchart schematically representing an optional flow of operations 500 for cache coherency, according to some embodiments. In a first memory access example, in 510 processing core 110A optionally receives a memory access command comprising a memory address associated with memory area 130A. Optionally, processing core 110A is a member of cluster 410A for memory area 130A. Optionally in this example memory area 130A is cached in cache node 120B.

In 520, processing core 110A optionally computes a determination of target cache node 120B, optionally according to the memory access command. Optionally, target cache node 120B is associated with processing core 110B which is also a member of cluster 410A with regards to memory area 130A. Optionally, computing the determination of the target cache node comprises applying a deterministic function to one or more parameters derived from the memory access command. Some examples of a parameter derived from a memory access command include, but are not limited to, a memory address, an access type, for example via a bus, a controller etc., an originating process identifier, an originating processing core identifier, for example identifying processing core 110A, a memory area type, a type of data, an originating thread identifier, or a cache bit. A memory area type may be a technology of a memory area, for example non-volatile memory or random access such as dynamic random-access memory (DRAM), synchronous dynamic random-access memory (SDRAM) and static random access memory (SRAM). For example, the deterministic function may apply a hash algorithm such as SHA-256 or MD5 to a combination of a memory address and an originating processing core identifier, or may use arithmetic operations on a memory address.

In 530, processing core 110A optionally accesses memory area 130A according to the caching memory scheme associated for memory area 130A and cluster 410A, in this example the redirection caching scheme as described above.

Figure 6:
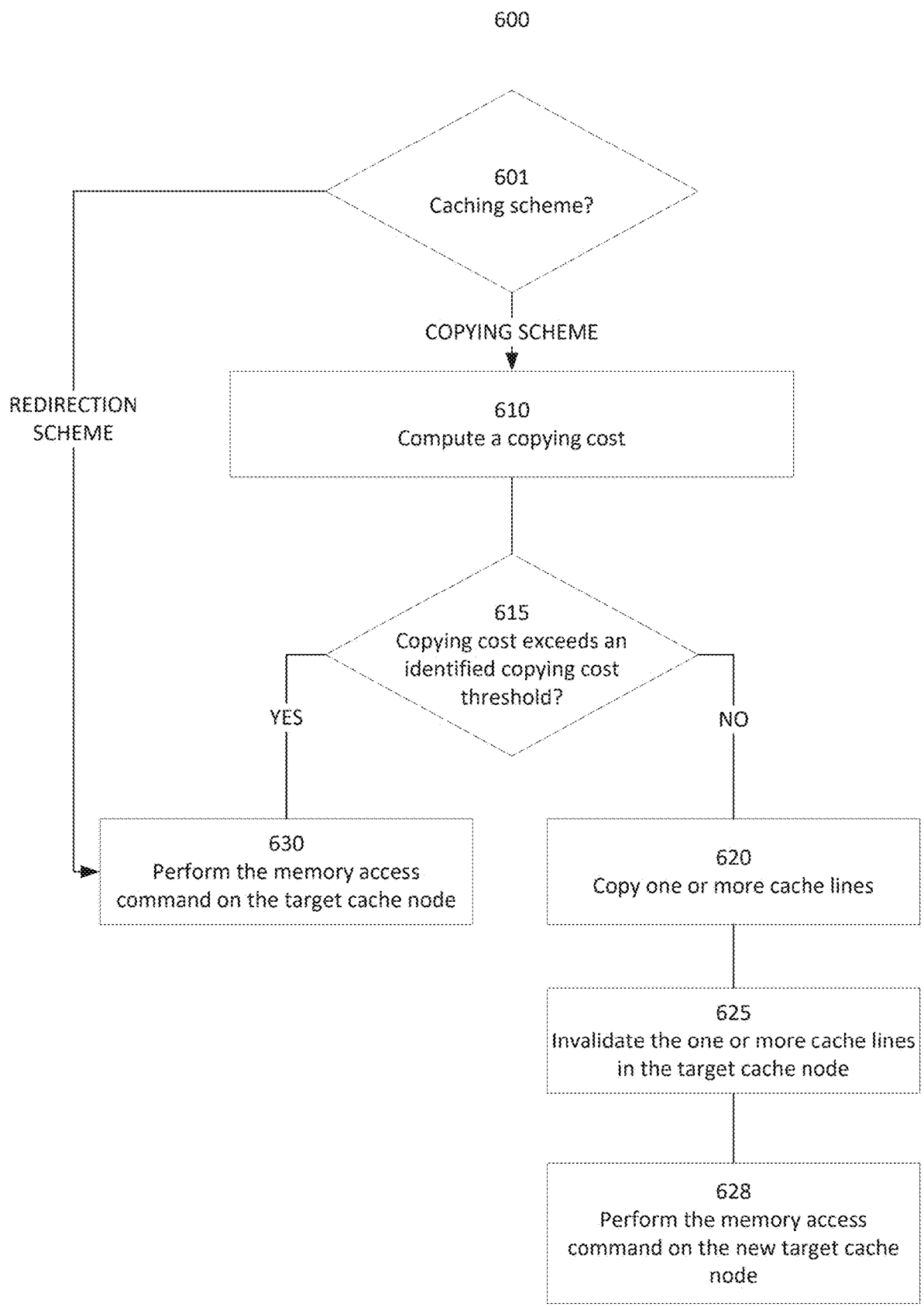
FIG. 6 is a flowchart schematically representing an optional flow of operations for accessing memory, according to some embodiments.

Reference is now made also to FIG. 6, showing a flowchart schematically representing an optional flow of operations 600 for accessing memory, according to some embodiments. In the first memory access example, in 601 processing core 110A identifies that the caching scheme is the redirection scheme and in 630 processing core 110A optionally performs the memory access command on target cache node 120B. Optionally, performing the memory access command comprises issuing a command to target cache node 120B to perform the memory access command.

Reference is made again to FIG. 5. In a second memory access example, in 510 processing core 110C optionally receives a memory access command comprising the memory address associated with memory area 130A. Optionally, processing core 110C is a member of cluster 410B for memory area 130A, optionally cached in cache node 120B.

In 520, processing core 110C optionally computes a determination of target cache node 120B, optionally according to the memory access command. Optionally, target cache node 120B is associated with processing core 110B which is a member of cluster 410A with regards to memory area 130A. In this example cluster 410A is not cluster 410B. Similarly to executing 520 in the first memory access example above, computing the determination of the target cache node in the second memory access example optionally comprises applying the deterministic function to one or more parameters derived from the memory access command. In the second memory access example the originating processing core identifier identifies processing core 110C.

In 530, processing core 110C optionally accesses memory area 130A according to the other caching memory scheme associated with memory area 130A and cluster 410B, which in this example is the copying caching scheme, as described above.

Reference is now made again to FIG. 6. In the second memory access example, in 601 processing core 110C identifies that the caching scheme is the copying scheme and in 610 processing core 110C optionally computes a copying cost. Optionally, processing core 110C computes the copying cost according to one or more parameters including: an identification of processing core 110C, an identification of processing core 110B, a topological relationship between processing core 110C and processing core 110B, and a number of bytes in one or more cache lines. Optionally, in 615 processing core 110C compares the processing cost to an identified copying cost threshold. Optionally, the identified copying cost threshold is a normalized value between 0 and 1, where 0 represents minimal cost and 1 represents maximum acceptable cost based on factors such as network latency, bandwidth utilization, and cache line size. Optionally, the copying cost is another normalized value between 0 and 1. Optionally, the identified copying cost threshold is a value in an identified range of numerical values. Optionally, the copying coset is yet another value in the identified range of numerical values.

Optionally, for example when the copying cost is less than the identified copying cost threshold, in 620 processing core 110C copies one or more cache lines from target cache node 120B to new target cache node 120C which is optionally local to processing core 110C. Optionally, in 625 processing core 110C invalidates the one or more cache lines in target cache node 120B, thus migrating the one or more cache lines from target cache node 120B to new target cache node 120C. Optionally, invalidating the one or more cache lines comprises flushing a TLB associated with processing core 110B. Optionally, 625 is executed before executing 620.

In 628 processing core 110C optionally performs the memory access command on new target cache node 120C.

Alternatively, for example when the copying cost exceeds the identified copying cost threshold, in 630 processing core 110C optionally performs the memory access command on target cache node 120B and not on new target cache node 120C. Optionally, performing the memory access command comprises issuing a command to target cache node 120B to perform the memory access command.

Reference is now made again to FIG. 3. Optionally, one or more of the plurality of processing cores 110, for example processing core 110C, is configured to receive the memory access command, compute the determination of the target cache node 120B and access memory area 130A through one or more cache control instructions executed by processing core 110C. Optionally, processing core 110C has no specialized hardware beyond standard cache coherency mechanisms.

Optionally, one or more other of the plurality of processing cores 110, for example processing core 110A, is configured to receive the memory access command, compute the determination of the target cache node 120B and access memory area 130A through memory management circuitry 140A, associated with processing core 110A. Optionally, memory management circuitry 140A implements copying, invalidating and redirection capabilities.

In 340, processing unit 101 optionally repeats collecting another plurality of memory access statistical values. Optionally, processing unit 101 repeats collecting a plurality of memory access statistical values, and one or more of analysis of the plurality of memory access statistical values, clustering the plurality of processing cores 110 in a plurality of clusters for each of the plurality of memory areas 130, associating each pair of memory area and associated cluster with a caching scheme, and configuring the plurality of processing cores 110 in each of a plurality of iterations. Optionally, at least some of the plurality of iterations are periodic, optionally at a predetermined interval. Optionally, at least some other of the plurality of iterations are scheduled for an identified time. Optionally, at least some additionally other of the plurality of iterations are triggered by an event, for example a change in the configuration of the plurality of processing cores 110, a change in one or more applications executed by system 100 or system 200, a topology change in system 100 or system 200, an application-specific optimization hint, an outcome of analyzing another plurality of memory access statistical values, or a number of cache coherency events (a statistical value).

In at least one of the plurality of iterations processing unit 101 optionally computes for cluster 410B (which comprises processing core 110C) a new association between memory area 130A and another of the plurality of caching schemes, for example the redirection scheme and further configures the plurality of processing cores 110 according to the new association.

Optionally, configuring the new association comprises flushing the TLB associated with processing core 110B. Optionally, configuring the new association comprises flushing another TLB associated with processing core 110C. Optionally, configuring the new association comprises flushing one or more of the plurality cache nodes 120 associated with processing core 110C, for example cache node 120C. Optionally, configuring the new association comprises flushing one or more other of the plurality of cache nodes associated with processing core 110B, for example cache node 120B. Optionally, configuring the new association comprises flushing one or more other additional cache nodes of the plurality of cache nodes that are associated with another processing core that is a member of cluster 410A (comprising processing core 110B) or cluster 410B (comprising processing core 110C), for example cache node 120A and additionally or alternatively cache node 120D.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant caching schemes will be developed and the scope of the term "caching scheme" is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for managing cache coherency, comprising:
a plurality of memory areas;
a plurality of processing cores connected to the plurality of memory areas;
a plurality of cache nodes caching the plurality of memory areas, each associated with at least one of the plurality of processing cores; and
at least one hardware processor configured to:
for each memory area of the plurality of memory areas:
cluster the plurality of processing cores into a plurality of clusters according to at least one memory access metric in relation to the memory area; and
for each cluster of the plurality of clusters, associate the memory area with one of a plurality of caching schemes; and
configure the plurality of processing cores to:
receive from a first processing core of the plurality of processing cores a memory access command comprising a memory address associated with a memory area of the plurality of memory areas, where the first processing core is a member of a first cluster for the memory area;
compute a determination of a target cache node of the plurality of cache nodes according to the memory access command, where the target cache node is associated with a second processing core of the plurality of processing cores; and
access the memory area according to the caching scheme associated with the memory area for the first cluster;
wherein the plurality of caching schemes comprises:
a copying scheme, allowing, when the first processing core accesses the memory area, at least one cache line associated with the memory area and cached in the target cache node to be copied to a new target cache node, of the plurality of cache nodes, local to the first processing core; and
a redirection scheme, wherein an access to the memory area from the first processing core must be redirected to the target cache node without duplication.

2. The system of claim 1, wherein a second cluster of the plurality of clusters comprises the second processing core, where the second cluster is not the first cluster; and
wherein the caching scheme associated with the memory area for the first cluster is the copying scheme.

3. The system of claim 1, wherein accessing the memory area according to the caching scheme comprises:
copying the at least one cache line containing the memory area to the new target cache node local to the first processing core; and
performing the memory access command on the new target cache node.

4. The system of claim 3, wherein accessing the memory area according to the caching scheme further comprises computing a copying cost according to at least one of: the first processing core, the second processing core and a number of bytes in the at least one cache line; and
wherein copying the at least one cache line is subject to the copying cost exceeding an identified copying cost threshold.

5. The system of claim 3, wherein accessing the memory area according to the caching scheme further comprises invalidating the at least one cache line in the target cache node.

6. The system of claim 1, wherein the first cluster comprises the second processing core;
wherein the caching scheme associated with the memory area for the first cluster is the redirection scheme; and
wherein accessing the memory area according to the caching scheme comprises issuing a command to the target cache node to perform the memory access command.

7. The system of claim 1, wherein computing the determination of the target cache node comprises applying a deterministic function to at least one parameter derived from the memory access command.

8. The system of claim 1, wherein the first processing core is associated with a page table comprising a plurality of page table entries; and
wherein associating the memory area with one of a plurality of caching schemes comprises storing the association in a page table entry (PTE) of the plurality of page table entries, the PTE corresponding to the memory area.

9. The system of claim 1, wherein the first processing core is associated with a translation lookaside buffer (TLB) comprising a plurality of TLB entries; and
wherein a field in a TLB entry of the plurality of TLB entries indicates a target cluster of the plurality of clusters for the memory area.

10. The system of claim 1, wherein each cluster of the plurality of clusters contains a common amount of processing cores.

11. The system of claim 1,
wherein the at least one hardware processor is further configured to:
collect a plurality of memory access statistical values of a plurality of memory accesses from the plurality of processing cores to the plurality of memory areas; and
cluster the plurality of processing cores into a plurality of clusters according to the at least one memory access metric further using the plurality of memory access statistical values; and wherein associating the memory area with one of a plurality of caching schemes for each of the plurality of clusters is further using the plurality of memory access statistical values.

12. The system of claim 1, wherein the at least one hardware processor is further configured to:
compute a new association between the memory area and another of the plurality of caching schemes; and
further configure the plurality of processing cores according to the new association.

13. The system of claim 12, wherein further configuring the plurality of processing cores according to the new association comprises flushing one or more of:
a TLB associated with the first processing core;
another TLB associated with the second processing core;
at least one of the plurality of cache nodes associated with the first processing core;
at least one other of the plurality of cache nodes associated with the second processing core; and
at least one additional cache node of the plurality of cache nodes associated with another processing core that is a member of another cluster of the plurality of clusters where the other cluster comprises at least one of the first processing core or the second processing core.

14. The system of claim 1, wherein the at least one memory access metric comprises at least one of: access latency, access frequency, memory bandwidth, cache-hit rate, or inter-core communication patterns.

15. The system of claim 1, further comprising specialized memory management circuitry associated with the first processing core; and
wherein the specialized memory management circuitry implements copying, invalidating and redirection capabilities.

16. The system of claim 1, wherein at least one of the plurality of processing cores is configured to receive, compute and access through at least one of:
one or more cache control instructions executed by the at least one processing core, without requiring specialized hardware beyond standard cache coherency mechanisms; or
memory management circuitry integrated with the at least one of the plurality of processing cores.

17. The system of claim 1, wherein at least some of the plurality of processing cores are implemented in a reconfigurable processing grid, comprising a plurality of logical elements connected by a plurality of reconfigurable data routing junctions.

18. A method for managing cache coherency, comprising:
for each memory area of a plurality of memory areas, cached in a plurality of cache nodes, each of the plurality of cache nodes associated with at least one of a plurality of processing cores connected to the plurality of memory areas:
clustering the plurality of processing cores into a plurality of clusters according to at least one memory access metric in relation to the memory area; and
for each cluster of the plurality of clusters, associating the memory area with one of a plurality of caching schemes, wherein the plurality of caching schemes comprises: a copying scheme, allowing, when the first processing core accesses the memory area, at least one cache line associated with the memory area and cached in the target cache node to be copied to a new target cache node, of the plurality of cache nodes, local to the first processing core; and a redirection scheme, wherein an access to the memory area from the first processing core must be redirected to the target cache node without duplication;

receiving from a first processing core of the plurality of processing cores a memory access command comprising a memory address associated with a memory area of the plurality of memory areas, where the first processing core is a member of a first cluster for the memory area;

computing a determination of a target cache node of the plurality of cache nodes according to the memory access command, where the target cache node is associated with a second processing core of the plurality of processing cores; and accessing the memory area according to the caching scheme associated with the memory area for the first cluster.

19. A software program product for managing cache coherency, comprising:

a non-transitory computer readable storage medium;

first program instructions for: for each memory area of a plurality of memory areas, cached in a plurality of cache nodes, each of the plurality of cache nodes associated with at least one of a plurality of processing cores connected to the plurality of memory areas: clustering the plurality of processing cores into a plurality of clusters according to at least one memory access metric in relation to the memory area; and for each cluster of the plurality of clusters, associating the memory area with one of a plurality of caching schemes, wherein the plurality of caching schemes comprises: a copying scheme, allowing, when the first processing core accesses the memory area, at least one cache line associated with the memory area and cached in the target cache node to be copied to a new target cache node, of the plurality of cache nodes, local to the first processing core; and a redirection scheme, wherein an access to the memory area from the first processing core must be redirected to the target cache node without duplication;

second program instructions for: receiving from a first processing core of the plurality of processing cores a memory access command comprising a memory address associated with a memory area of the plurality of memory areas, where the first processing core is a member of a first cluster for the memory area;

third program instructions for: computing a determination of a target cache node of the plurality of cache nodes according to the memory access command, where the target cache node is associated with a second processing core of the plurality of processing cores; and fourth program instructions for: accessing the memory area according to the caching scheme associated with the memory area for the first cluster;

wherein the first, second, third and fourth program instructions are executed by at least one computerized processor from the non-transitory computer readable storage medium.

* * * * *